United States Patent Office 3,699,111
Patented Oct. 17, 1972

3,699,111
HALOGEN SUBSTITUTED PYRININEALDEHYDE
PHENYL HYDRAZONES
Girts Kaugars, Kalamazoo, Mich., assignor to The
Upjohn Company, Kalamazoo, Mich.
No Drawing. Filed Oct. 5, 1970, Ser. No. 78,166
Int. Cl. C07d 31/40, 31/42
U.S. Cl. 260—296 R      6 Claims

ABSTRACT OF THE DISCLOSURE

This invention relates to novel heterocyclic acid chloride phenylhydrazones embraced by the formula

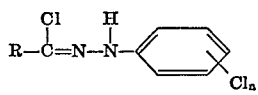

wherein R is a radical selected from the group consisting of furyl, thienyl and pyridyl, each of which has from zero through three substituents selected from the group consisting of alkyl, halo and nitro, and $n$ is an integer of from zero through three. These compounds are primarily useful as insecticides and miticides and also as herbicides, anti-inflammatories and anthelmintics.

BRIEF SUMMARY OF THE INVENTION

This invention pertains to a new method of combating pestiferous insects and mites, new insecticidal and miticidal compositions, and new chemical compounds. The invention is more particularly directed to a new method of combating insects and mites using certain novel heterocyclic acid chloride phenylhydrazones, to new insecticidal and miticidal compositions comprising said phenylhydrazones, and to the aforesaid new phenylhydrazones that have the general structural formula

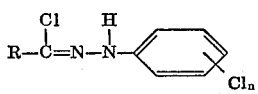

wherein R is a radical selected from the group consisting of furyl, thienyl and pyridyl, each of which has from zero through three substituents selected form the group consisting of alkyl, halo and nitro, and $n$ is an integer of from zero through three.

Examples of alkyl inilude methyl, ethyl, propyl, butyl, pentyl, hexyl and the isomeric forms thereof. Examples of halo include fluorine, chlorine, bromine and iodine.

The insecticidal and miticidal heterocyclic acid chloride phenylhydrazones (I) in this invention are readily prepared by known methods. For example, by reacting (in known manner) a phenylhydrazine with a furoyl chloride or thiophenecarbonyl chloride to yield a corresponding furoic acid phenylhydrazide or thiophenecarboxylic acid phenylhydrazide, reacting the resulting corresponding hydrazide with phosphorus pentachloride, adding phenol to the reaction mixture and recovering the desired furoyl (or thiophenecarbonyl) chloride phenylhydrazone. A variation of this procedure comprises reacting, in known manner, a phenylhydrazine with a heterocyclic aldehyde, for example, a picolinaldehyde or a nicotinaldehyde, to yield a corresponding picolinaldehyde phenylhydrazone or nicotinaldehyde phenylhydrazone, reacting the resulting corresponding hydrazone with chlorine and recovering the desired picolinoyl (or nicotinoyl) chloride phenylhydrazone. The processes can be represented as follows:

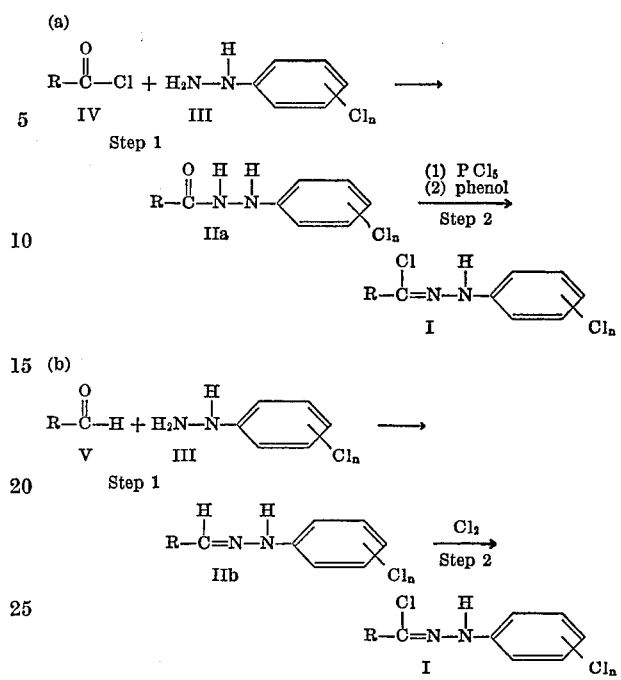

In process (a), Step 1 is carried out by mixing approximately equimolar amounts of a known starting heterocyclic acid chloride (IV) with a known phenylhydrazine (III) in an appropriate reaction medium at low to moderate temperatures (from about —10° C. to about 20° C.) to yield a corresponding heterocyclic acid phenylhydrazide (IIa). Step 2 comprises heating (in an inert solvent at a temperature in the range of about 10° C. to about the boiling point of said solvent) a thus produced compound of Formula IIa with phosphorus pentachloride (in approximately equimolar amounts) to give a corresponding heterocyclic acid chloride (dichlorophosphinyl) phenylhydrazone intermediate, which on reaction (without isolation and purification) with a cooled inert solvent solution of phenol, yields a corresponding heterocyclic acid chloride phenylhydrazone (I) and triphenyl phosphate. The compound of Formula I is recovered and purified by conventional methods, e.g., by removing the solvent (e.g., by evaporation) and separating the product (I), e.g., by filtration from the residual triphenyl phosphate or by chromatography. Purification of the product (I) can be accomplished by recrystallization.

Step 1 of process (b) differs from the first step of (a) by employing a heterocyclic aldehyde (V) as the compound reacted with a phenylhydrazine (III); this step yields a corresponding heterocyclic aldehyde phenylhydrazone (IIb). Step 1 of process (b) is carried out by heating the starting compounds (V and III), preferably at reflux temperatures, in an appropriate reaction medium. Step 2 comprises reacting a thus produced phenylhydrazone of Formula IIb with chlorine at low temperature (from about —20° C. to about —60° C.) to yield a corresponding heterocyclic acid chloride phenylhydrazone (I). The recovery and purification of the product (I) is carried out by conventional procedures.

Appropriate reaction media include, for example, chlorinated hydrocarbon solvents, aliphatic and aromatic hydrocarbon solvents, and ethers. Representative specific ones are carbon tetrachloride, methylene chloride, chloroform, 1,2-dichloroethylene, benzene, toluene, hexanes, diethyl ether and dioxane.

All of the compounds included within Formula I and the intermediates therefor of the flow-sheets, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an absorbent column with a suitable solvent such as acetone, ethyl acetate, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The heterocyclic acid chloride (IV), heterocyclic aldehydes (V) and phenylhydrazines (III) employed as starting compounds are known or can be prepared by known methods. Known compounds of Formula IV include 5-butyl-2-furoyl chloride, 5-bromo-2-furoyl chloride, 3,4-dichloro-2-furoyl chloride, 3-methyl-2-furoyl chloride, 5-nitro-2-furoyl chloride, 3,4,5-trichloro-2-furoyl chloride, 5-bromo-2-thiophenecarbonyl chloride, 5-t-butyl-2-thiophenecarbonyl chloride, 5-ethyl-2-thiophenecarbonyl chloride, 3,5-diethyl-2-thiophenecarbonyl chloride, 5-methyl-4-nitro-2-thiophenecarbonyl chloride, etc. Known compounds of Formula V include 5-chloropicolinaldehyde, 5-methylpicolinaldehyde, 5-nitropicolinaldehyde, 4-chloro-5-ethylpicolinaldehyde, 6 - methyl-4-nitropicolinaldehyde, 4,6-dimethyl-5-nitropicolinaldehyde, 2-methylnicotinaldehyde, 2 - nitronicotinaldehyde, 5 - bromonicotinaldehyde, 2-ethylisonicotinaldehyde, 5-ethyl-2-methylisonicotinaldehyde, etc. Known compounds of Formula III include o-, m- and p-chlorophenylhydrazine, 2,4-, 2,5- and 3,5-dichlorophenylhydrazine, 2,4,5-, 3,4,5- and 2,4,6-trichlorophenylhydrazine, etc.

DETAILED DESCRIPTION

It is to be understood that the invention is not to be limited to the exact details of operation or exact compounds described herein, as obvious modifications and equivalents will be apparent to one skilled in the art, and the invention is therefore to be limited only by the scope of the appended claims.

*Example 1.—2-furoyl chloride phenylhydrazone (I)*

PART A.—2-FUROIC ACID 2-PHENYLHYDRAZIDE (IIa)

To 27 g. (0.25 mole) of phenylhydrazine (III) in 400 ml. of pyridine, 32.6 g. (0.25 mole) of 2-furoyl chloride (IV) is added while the reaction solution is cooled in an ice bath. After about 48 hours at room temperature the pyridine is removed under reduced pressure, the residue poured into ice water, the solids collected, dried in the filter funnel and washed with ether. The solids are first recrystallized from 95% alcohol and then from alcohol-Skellysolve B to yield 24 g. (47.5% of theoretical) of 2-furoic acid phenylhydrazide (IIa), having a melting point of 143.5 to 145° C.

Analysis.—Calcd. for $C_{11}H_{10}N_2O_2$ (percent): C, 65.33; H, 4.98; N, 13.86. Found (percent): C, 65.36; H, 4.86; N, 13.74.

PART B.—2-FUROYL CHLORIDE PHENYLHYDRAZONE (I)

To 21.6 g. (0.104 mole) of phosphorus pentachloride suspended in 200 ml. of carbon tetrachloride, 20.2 g. (0.1 mole) of 2-furoic acid 2-phenylhydrazide (IIa) (prepared in Part A of Example 1) is added in several portions. After the evolution of gas ceases, the solution is refluxed for about 0.5 hour, cooled and slowly poured into a mixture of 30.1 g. (0.32 mole) of phenol and 150 ml. of carbon tetrachloride. After about 1 hour the solvent is removed under reduced pressure and 9 g. of nearly white product (I) collected. An analytical sample of 2-furoyl chloride phenylhydrazone (I) with a melting point of 94 to 96° C. is obtained by recrystallizing the crude product (I) twice from Skellysolve B and once from acetonitrile.

Analysis.—Calcd. for $C_{11}H_9ClN_{20}$ (percent): C, 59.88; H, 4.11; Cl, 16.07; N, 12.69. Found (percent): C, 60.24; H, 4.11; Cl, 16.08; N, 12.74.

*Example 2.—5-bromo-2-furoyl chloride phenylhydrazone (I)*

PART A.—5-BROMO-2-FUROIC ACID 2-PHENYLHYDRAZIDE (IIa)

To 13.5 g. (0.125 mole) of phenylhydrazine (III) in 350 ml. of pyridine, 26.2 g. (0.125 mole) of 5-bromo-2-furoyl chloride (IV) in 50 ml. of tetrahydrofuran is added at between about 0 and 5° C. After about 48 hours at room temperature the solution is poured into water, the solids collected and washed successively with water, dilute hydrochloric acid and water. The resulting material is recrystallized from ethyl alcohol to yield 20 g. (56.9%) of product (IIa) with a melting point of 164 to 165° C. An analytical sample of 5-bromo-2-furoic acid 2-phenylhydrazide (IIa) with the same melting point is obtained by a second recrystallization from ethyl alcohol.

Analysis.—Calcd. for $C_{11}H_9BrN_2O_2$ (percent): C, 46.99; H, 3.23; Br, 28.43; N, 9.97. Found (percent): C, 47.28; H, 3.21; Br, 28.66; N, 9.82.

PART B.—5-BROMO-2-FUROYL CHLORIDE PHENYLHYDRAZONE (I)

Following the procedure of Part B of Example 1, 5-bromo-2-furoic acid 2-phenylhydrazide (IIa) (prepared in Part A of Example 2) is converted to 5-bromo-2-furoyl chloride phenylhydrazone (I). It is purified by column chromatography using silica gel (silicic acid) with 1:1 Skellysolve B-benzene to give the product (I) having a melting point of 40 to 42° C.

*Example 3.—2-thiophenecarbonyl chloride phenylhydrazone (I)*

PART A.—2-THIOPHENECARBOXYLIC ACID 2-PHENYLHYDRAZIDE (IIa)

To 36.05 (0.334 mole) of phenylhydrazine (III) in 300 ml. of pyridine, 49 g. of 2-thiophenecarbonyl chloride (IV) is added at between about 5 to about 15° C. After about 48 hours at room temperature about half of the pyridine is removed under reduced pressure and the remainder of the reaction mixture is poured into 1.5 l. of water. The solids are collected and washed with water and recrystallized from ethanol to yield 45 g. (61.7%) of product (IIa) melting at 180 to 182° C. The analytical sample of 2-thiophenecarboxylic acid 2-phenylhydrazide (IIa), melting at 178 to 179° C., is obtained by decolorizing with charcoal and recrystallizing again from ethanol.

Analysis.—Calcd. for $C_{11}H_{10}N_2OS$ (percent): C, 60.53; H, 4.62; N, 12.83; S, 14.69. Found (percent): C, 60.57; H, 4.73; N, 12.50; S, 14.66.

PART B.—2-THIOPHENECARBONYL CHLORIDE PHENYLHYDRAZONE (I)

To 21.7 g. (0.104 mole) of phosphorus pentachloride suspended in 200 ml. of carbon tetrachloride, 21.8 g. (0.1 mole) of 2-thiophenecarboxylic acid 2-phenylhydrazide (IIa) (prepared in Part A of Example 3) is added. After the solution is refluxed until no more gas is given off, it is cooled, filtered and poured into a solution of 30.1 g. (0.32 mole) of phenol in 150 ml. of carbon tetrachloride that is cooled in an ice-bath. The solution is filtered and the solvent removed under reduced pressure. The residue is chromatographed on 1 kg. of silica gel with 1:1 Skellysolve B-benzene to yield 4 g. (16.9%) of 2-thiophenecarbonyl chloride phenylhydrazone (I) melting at 82.5 to 83.5° C. after two recrystallizations from Skellysolve B.

Analysis.—Calcd. for $C_{11}H_9ClN_2S$ (percent): C, 55.81; H, 3.83; Cl, 14.98; N, 11.83; S, 13.54. Found (percent): C, 55.59; H, 3.89; Cl, 15.19; N, 11.60; S, 13.76.

*Example 4.—Picolinoyl chloride (2,4,6-trichlorophenyl)-hydrazone (I)*

PART A.—PICOLINALDEHYDE (2,4,6-TRICHLOROPHENYL)-HYDRAZONE (IIb)

A mixture of 16.05 g. (0.15 mole) of picolinaldehyde (V) and 31.62 g. (0.15 mole) of 2,4,6-trichlorophenylhydrazine (III) in 300 ml. of ethyl alcohol is stirred at room temperature for about 10 minutes. The mixture is heated to reflux, allowed to cool and the solids filtered off and recrystallized from ethyl alcohol to yield 13.0 g. (28.9%) of picolinaldehyde (2,4,6-trichlorophenyl)hydrazone (IIb), having a melting point of 127 to 128° C.

*Analysis.*—Calcd. for $C_{12}H_8Cl_3N_3$ (percent): C, 47.95; H, 2.68; Cl, 35.39; N, 13.98. Found (percent): C, 48.00; H, 2.83; Cl, 35.45; N, 13.86.

PART B.—PICOLINOYL CHLORIDE (2,4,6-TRICHLOROPHENYL)HYDRAZONE (I)

To 10 g. (0.33 mole) of picolinaldehyde (2,4,6-trichlorophenyl)hydrazone (IIb) (prepared in Part A of Example 4) in 300 ml. of alcohol-free chloroform at about 60° C., 2.1 ml. (0.046 mole) of chlorine is added through a bubbler tube. The solution is allowed to warm to room temperature and then saturated with hydrogen chloride. The solvent is removed under reduced pressure and the residue chromatographed on 460 g. of silica gel with chloroform to yield 3 g. (27%) of picolinoyl chloride (2,4,6-trichlorophenyl)hydrazone (I) melting at 131 to 132° C. after recrystallization from Skellysolve B.

*Analysis.*—Calcd. for $C_{12}H_7Cl_4N_3$ (percent): C, 43.02; H, 2.11; Cl, 42.33; N, 12.54. Found (percent): C, 43.14; H, 2.20; Cl, 42.35; N, 12.45.

*Example 5.—Nicotinoyl chloride (2,4,6-trichlorophenyl)hydrazone (I)*

PART A.—NICOTINALDEHYDE (2,4,6-TRICHLOROPHENYL)HYDRAZONE (IIb)

A mixture of 31.62 g. (0.15 mole) of 2,4,6-trichlorophenylhydrazine (III) and 16.05 g. (0.150 mole) of nicotinaldehyde (V) in 400 ml. of ethyl alcohol is heated at reflux until solution is complete, allowed to cool and the solids filtered and recrystallized from ethyl alcohol to yield 25.0 g. (55.5%) of nicotinaldehyde (2,4,6-trichlorophenyl)hydrazone (IIb), having a melting point of 136.5 to 137.5° C.

*Analysis.*—Calcd. for $C_{12}H_8Cl_3N_3$ (percent): C, 47.95; H, 2.68; N, 13.98. Found (percent): C, 47.82; H, 2.84; N, 14.03.

PART B.—NICOTINYL CHLORIDE (2,4,6-TRICHLOROPHENYL)HYDRAZONE (I)

To 300 ml. of chloroform at about −20° C., 3.7 ml. (0.07 mole) of chlorine is added through a bubbler tube. To the chlorine solution 15 g. (0.05 mole) of nicotinaldehyde (2,4,6-trichlorophenyl)hydrazone (IIb) (prepared in Part A of Example 5) is added in one portion. The reaction mixture is allowed to warm to room temperature. The solid is filtered and partially extracted with refluxing chloroform. The chloroform extract is cooled and Skellysolve B added to precipitate 4.5 g. of solid that darkens at 180° C. and decomposes between 200 to 210° C. A 1.0 g. portion of the solid is dissolved in methylene chloride and chromatographed on 60 g. of silica gel with methylene chloride to yield 0.3 g. of nictoinoyl chloride (2,4,6-trichlorophenyl)hydrazone (I), melting at 104 to 105° C.

*Analysis.*—Calcd. for $C_{12}H_7Cl_4N_3$ (percent): C, 43.03; H, 2.11; N, 12.54. Found (percent): C, 43.14; H, 1.96; N, 12.56.

*Example 6.—Nicotinoyl chloride phenylhydrazone (I)*

PART A.—NICOTINIC ACID 2-PHENYLHYDRAZIDE (IIa)

To 32.4 g. (0.3 mole) of phenylhydrazine (III) and 45.3 g. (0.3 mole) of ethyl nicotinate (also known as nicotinic acid ethyl ester) in 400 ml. of methanol, 16.22 g. (0.3 mole) of sodium methoxide is added and the mixture heated at reflux for about 72 hours. The solvent is removed under reduced pressure and the residue poured into 1 liter of water containing 25 ml. of concentrated hydrochloric acid. The oil formed is separated and extracted into methylene chloride and dried over sodium sulfate. The solvent is removed and the resulting oil chromatographed on 1 kg. of silica gel with ethyl acetate to give a solid which on recrystallization from 95% ethanol yields 13 g. of nicotinic acid 2-phenylhydrazide (IIa), melting at 142.5 to 144° C.

*Analysis.*—Calcd. for $C_{12}H_{11}N_3O$ (percent): C, 67.59; H, 5.20; N, 19.71. Found (percent): C, 67.30; H, 5.19; N, 19.96.

PART B.—NICOTINOYL CHLORIDE PHENYLHYDRAZONE (I)

To 11.4 g. (0.055 mole) of phosphorus pentachloride suspended in 150 ml. of carbon tetrachloride, 10.66 g. (0.055 mole) of nicotinic acid 2-phenylhydrazide (IIa) (prepared in Part A of Example 6) is added. The reaction mixture is refluxed for about 18 hours, cooled and 16.45 g. (0.175 mole) of phenol in 75 ml. of carbon tetrachloride slowly added. The reaction mixture is stirred for about 1 hour. The solid that forms is filtered off and taken up in methanol. The methanol is removed under reduced pressure and the residue extracted with water and methylene chloride. The methylene chloride layer is dried and the solvent removed leaving an oil that is chromatographed on 400 g. of silica gel with 1:1 benzene:ethyl acetate to yield 3.3 g. (28.6%) of product (I), which after one recrystallization from Skellysolve B and one from ethyl acetate yields 2.3 g. (20%) of nicotinoyl chloride phenylhydrazone (I), having a melting point of 127 to 129° C.

*Analysis.*—Calcd. for $C_{12}H_{10}ClN_3$ (percent): C, 62.21; H, 4.35; Cl, 15.31; N, 18.14. Found (percent): C, 62.00; H, 4.52; Cl, 15.58; N, 18.33.

*Example 7.—2-chloropyridine-4-carbonyl chloride (2,4,6-trichlorophenyl)hydrazone*

PART A.—ISONICOTINALDEHYDE (2,4,6-TRICHLOROPHENYL)HYDRAZONE (IIb)

A mixture of 31.62 g. (0.15 mole) of 2,4,6-trichlorophenylhydrazine (III) and 16.05 g. (0.15 mole) of isonicotinaldehyde (V) (also known as pyridine-4-carboxaldehyde) in 400 ml. of ethyl alcohol, is heated at reflux until solution is complete, allowed to cool, the solids filtered off and recrystallized from ethyl alcohol to yield 31.6 g. (70%) of isonicotinaldehyde (2,4,6-trichlorophenyl)hydrazone (IIb), melting at 176 to 178° C.

*Analysis.*—Calcd. for $C_{12}H_8Cl_3N_3$ (percent): C, 47.95; H, 2.68; N, 13.98. Found (percent): C, 47.73; H, 2.77; N, 13.84.

PART B.—2-CHLOROPYRIDINE-4-CARBONYL CHLORIDE (2,4,6-TRICHLOROPHENYL)HYDRAZONE (I)

To 15 g. (0.05 mole) of isonicotinaldehyde (2,4,6-trichlorophenyl)hydrazone (IIb) (prepared in Part A of Example 7) in 300 ml. of methylene chloride at −60° C., 3.7 ml. of (0.07 mole) of chlorine is added through a bubbler tube and the reaction mixture allowed to warm to room temperature. The solid that forms is filtered off and partially dissolved in refluxing chloroform. The chloroform solution is filtered and cooled; 500 ml. of Skellysolve B is added and the resulting solid filtered off to yield 2.3 g. of solid, melting at 163 to 164° C. (with decomposition). The solid is dissolved in chloroform and chromatographed over 200 g. of silica gel with chloroform to yield 0.5 g. (2.7%) of 2-chloropyridine-4-carbonyl chloride (2,4,6-trichlorophenyl)hydrazone (I), having a melting point of 83.5 to 85° C.

*Analysis.*—Calcd. for $C_{12}H_6Cl_5N_3$ (percent): C, 39.01; H, 1.64; N, 11.37. Found (percent): C, 38.71; H, 1.67; N, 11.82.

Following the procedure of Part A of Example 7, but substituting other phenylhydrazines (III) such as (1) phenylhydrazine (III),
(2) o-chlorophenylhydrazine (III),
(3) 3,5-dichlorophenylhydrazine (III),
(4) 2,4,5-trichlorophenylhydrazine (III), etc., yields, respectively, (1) isonicotinaldehyde phenylhydrazone (IIb),
(2) isonicotinaldehyde (o-chlorophenyl)hydrazone (IIb),
(3) isonicotinaldehyde (3,5 - dichlorophenyl)hydrazone (IIb),
(4) isonicotinaldehyde (2,4,5-trichlorophenyl)hydrazone (IIb), etc.

Following the procedure of Part B of Example 7, but substituting other isonicotinaldehyde phenylhydrazones (IIb), such as (1) isonicotinaldehyde (p-chlorophenyl)hydrazone (IIb),
(2) isonicotinaldehyde (2,4 - dichlorophenyl)hydrazone (IIb), etc., yields, respectively, (1) 2-chloropyridine-4-carbonyl chloride (p-chlorophenyl)hydrazone (I),
(2) chloropyridine-4-carbonyl chloride (2,4-dichlorophenyl)hydrazone (I), etc.

*Example 8.—Other heterocyclic acid chloride phenylhydrazones (I)*

PART A

Following the procedure of Part A of Examples 1 and 2, but substituting other known phenylhydrazines (III) and other known 2-furoyl chlorides (IV), such as (1) p-chlorophenylhydrazine (III) and 5-butyl-2-furoyl chloride (IV),
(2) 2,4-dichlorophenylhydrazine (III) and 3,4-dichloro-2-furoyl chloride (IV),
(3) 3,5-dichlorophenylhydrazine (III) and 3-methyl-2-furoyl chloride (IV),
(4) 2,4,5-trichlorophenylhydrazine (III) and 5-nitro-2-furoyl chloride (IV),
(5) 3,4,5-trichlorophenylhydrazine (III) and 3,4,5-trichloro2-furoyl chloride (IV), yields, respectively, (1) 5-butyl-2-furoic acid 2-(p-chlorophenyl)hydrazide (IIa),
(2) 3,4-dichloro-2-furoic acid 2-(2,4-dichlorophenyl)-hydrazide (IIa),
(3) 3-methyl-2-furoic acid 2-(3,5-dichlorophenyl)-hydrazide (IIa),
(4) 5-nitro-2-furoic acid 2-(2,4,5-trichlorophenyl) hydrazide (IIa),
(5) 3,4,5-trichloro-2-furoic acid 2-(3,4,5-trichlorophenyl)hydrazide (IIa),
(6) 5-methyl-2-furoic acid 2-(2,4,5-trichlorophenyl)-hydrazide (IIa), etc.

PART B

Following the procedure of Part B of Examples 1 and 2, but substituting other 2-furoic acid 2-phenylhydrazides (IIb) (prepared as in Part A of Example 8), such as (1) 3-methyl-2-furoic acid 2-(o-chlorophenyl)hydrazide (IIa),
(2) 5-methyl-2-furoic acid 2-(2,4-dichlorophenyl)-hydrazide (IIa),
(3) 5-butyl-2-furoic acid 2-(2,5-dichlorophenyl)-hydrazide (IIa),
(4) 5-nitro-2-furoic acid 2-(3,5-dichlorophenyl)-hydrazide (IIa),
(5) 3,4-dichloro-2-furoic acid 2-(2,4,5-trichlorophenyl) hydrazide (IIa),
(6) 3,4,5-trichloro-2-furoic acid 2-(3,4,5-trichlorophenyl)hydrazide (IIa), etc.

yields, respectively, (1) 3-methyl-2-furoyl chloride (o-chlorophenyl)hydrazone (I),
(2) 5-methyl-2-furoyl chloride (2,4-dichlorophenyl)hydrazone (I),
(3) 5-butyl-2-furoyl chloride (2,5-dichlorophenyl)hydrazone (I),
(4) 5-nitro-2-furoyl chloride (3,5-dichlorophenyl)hydrazone (I),
(5) 3,4-dichloro-2-furoyl (2,4,5-trichlorophenyl)hydrazone (I),
(6) 3,4,5-trichloro-2-furoyl chloride (3,4,5-trchlorophenyl)hydrazone (I), etc.

*Example 9.—Other heterocyclic acid chloride phenylhydrazones (I)*

PART A

Following the procedure of Part A of Example 3, but substituting other known phenylhydrazines (III) and other known 2-thiophenecarbonyl chlorides (IV) such as (1) o-chlorophenylhydrazine (III) and 5-bromo-2-thiophenacarbonyl chloride (IV),
(2) m-chlorophenylhydrazine (III) and 5-chloro-2-thiophenecarbonyl chloride (IV),
(3) p-chlorophenylhydrazine (III) and 3-methyl-2-thiophenecarbonyl chloride (IV),
(4) 2,4-dichlorophenylhydrazine (III) and 3-methyl-2-thiophenecarbonyl chloride (IV),
(5) 2,5-dichlorophenylhydrazine (III) and 5-ethyl-2-thiophenecarbonyl chloride (IV),
(6) 3,5-dichlorophenylhydrazine (III) and 5-(t-butyl)-2-thiophenecarbonyl chloride (IV),
(7) 2,4,5-trichlorophenylhydrazine (III) and 3,5-dimethyl-2-thiophenecarbonyl chloride (IV),
(8) 3,4,5-trichlorophenylhydrazine (III) and 4,5-diethyl-2-thiophenecarbonyl chloride (IV),
(9) 2,4,6-trichlorophenylhydrazine (III) and 5-methyl-4-nitro-2-thiophenecarbonyl chloride (IV), etc.

yields, respectively, (1) 5-bromo-2-thiophenecarboxylic acid 2-(o-chlorophenyl)hydrazide (IIa),
(2) 5-chloro-2-thiophenecarboxylic acid 2-(m-chlorophenyl)hydrazide (IIa),
(3) 3-methyl-2-thiophenecarboxylic acid 2-(p-chlorophenyl)hydrazide (IIa),
(4) 3-methyl-2-thiophenecarboxylic acid 2-(2,4-dichlorophenyl)hydrazide (IIa),
(5) 5-ethyl-2-thiophenecarboxylic acid 2-(2,5-dichlorophenyl)hydrazide (IIa),
(6) 5-(t-butyl)-2-thiophenecarboxylic acid 2-(3,5-dichlorophenyl)hydrazide (IIa),
(7) 3,5-dimethyl-2-thiophenecarboxylic acid 2-(2,4,5-trichlorophenyl)hydrazide (IIa),
(8) 4,5-diethyl-2-thiophenecarboxylic acid-2-(3,4,5-trichlorophenyl)hydrazide (IIa),
(9) 5-methyl-4-nitro-2-thiophenecarboxylic acid 2-(2,4,6-trichlorophenyl)hydrazide (IIa), etc.

PART B

Following the procedure of Part B of Example 3, but substituting other 2-thiophenecarboxylic acid 2-phenylhydrazides (IIa) (prepared as in Part A of Example 9), such as (1) 5-bromo-2-thiophenecarboxylic acid 2-(p-chlorophenyl)hydrazide (IIa),
(2) 5-chloro-2-thiophenecarboxylic acid 2-(o-chlorophenyl)hydrazide (IIa),
(3) 3-methyl-2-thiophenecarboxylic acid 2-(2,4-dichlorophenyl)hydrazide (IIa),
(4) 3-methyl-2-thiophenecarboxylic acid 2-(3,5-dichlorophenyl)hydrazide (IIa),
(5) 5-ethyl-2-thiophenecarboxylic acid 2-(2,4-dichlorophenyl)hydrazide (IIa), (6) 5-(t-butyl)-2-thiophenecarboxylic acid 2-(2,4-dichlorophenyl)hydrazide (IIa),
(7) 3,5-dimethyl-2-thiophenecarboxylic acid 2-(2,4,6-trichlorophenyl)hydrazide (IIa),
(8) 3,5-diethyl-2-thiophenecarboxylic acid 2-(2,4,5-trichlorophenyl)hydrazide (IIa),
(9) 5-methyl-4-nitro-2-thiophenecarboxylic acid 2-(3,4,5-trichlorophenyl)hydrazide (IIa), etc., yields, respectively, (1) 5-bromo-2-thiophenecarbonyl chloride (p-chlorophenyl)hydrazone (I),
(2) 5-chloro-2-thiophenecarbonyl chloride (o-chlorophenyl)hydrazone (I),
(3) 3-methyl-2-thiophenecarbonyl chloride (2,4-dichlorophenyl)hydrazone (I),
(4) 3-methyl-2-thiophenecarbonyl chloride 3,5-dichlorophenyl)hydrazone (I),
(5) 5-ethyl-2-thiophenecarbonyl chloride 2,4-dichlorophenyl)hydrazone (I),
(6) 5-(t-butyl)-2-thiophenecarbonyl chloride (2,4-dichlorophenyl)hydrazone (I),
(7) 3,5-dimethyl-2-thiophenecarbonyl chloride (2,4,6-trichlorophenyl)hydrazone (I),
(8) 3,5-diethyl-2-thiophenecarbonyl chloride (2,4,5-trichlorophenyl)hydrazone (I),
(9) 5-methyl-4-nitro-2-thiophenecarbonyl chloride (3,4,5-trichlorophenyl)hydrazone (I), etc.

*Example 10.—Other heterocyclic acid chloride phenylhydrazones (I)*

PART A

Following the procedure of Part A of Example 4, but substituting other known phenylhydrazines (III) and other known picolinaldehydes (V), such as (1) phenylhydrazine (III) and picolinaldehyde (V),
(2) m-chlorophenylhydrazine (III) and 5-chloropicolinaldehyde (V),
(3) p-chlorophenylhydrazine (III) and 4-methylpicolinaldehyde (V),
(4) 2,4-dichlorophenylhydrazine (III) and 5-methylpicolinaldehyde (V),
(5) 2,5-dichlorophenylhydrazine (III) and 6-methylpicolinaldehyde (V),
(6) 3,6-dichlorophenylhydrazine (III) and 3-ethylpicolinaldehyde (V),
(7) 2,4,5-trichlorophenylhydrazine (III) and 5-ethylpicolinaldehyde (V),
(8) 3,4,5-trichlorophenylhydrazine (III) and 3-propylpicolinaldehyde (V),
(9) 2,4,6-trichlorophenylhydrazine (III) and 3-butylpicolinaldehyde (V),
(10) o-chlorophenylhydrazine(III) and 3-pentylpicolinaldehyde (V),
(11) m-chlorophenylhydrazine (III) 3-nitropicolinaldehyde (V),
(12) p-chlorophenylhydrazine (III) and 4-nitropicolinaldehyde (V),
(13) 2,4-dichlorophenylhydrazine (III) 5-nitropicolinaldehyde (V),
(14) 2,5-dichlorophenylhydrazine (III) and 4-chloro-5-ethylpicolinaldehyde (V),
(15) 3,5-dichlorophenylhydrazine (III) and 4-chloro-6-methylpicolinaldehyde (V),
(16) 2,4,5-trichlorophenylhydrazine (III) and 5-ethyl-4-methylpicolinaldehyde (V),
(17) 3,4,5-trichlorophenylhydrazine (III) and 4-methyl-5-nitropicolinaldehyde (V),
(18) 2,4,6-trichlorophenylhydrazine (III) and 6-methyl-4-nitropicolinaldehyde (V),
(19) o-chlorophenylhydrazine (III) and 6-methyl-5-nitropicolinaldehyde (V),
(20) 2,4-dichlorophenylhydrazine (III) and 4,6-dimethyl-5-nitropicolinaldehyde (V), etc., yields, respectively, (1) picolinaldehyde phenylhydrazone (IIb),
(2) 5-chloropicolinaldehyde (m-chlorophenyl)hydrazone (IIb),
(3) 4-methylpicolinaldehyde (p-chlorophenyl)hydrazone (IIb),
(4) 5-methylpicolinaldehyde (2,4-dichlorophenyl)hydrazone (IIb),
(5) 6-methylpicolinaldehyde (2,5-dichlorophenyl) hydrazone (IIb),
(6) 3-ethylpicolinaldehyde (3,5-dichlorophenyl)hydrazone (IIb),
(7) 5-ethylpicolinaldehyde (2,4,5-trichlorophenyl)-hydrazone (IIb),
(8) 3-propylpicolinaldehyde (3,4,5-trichlorophenyl)-hydrazone (IIb),
(9) 3-butylpicolinaldehyde (2,4,6-trichlorophenyl)-hydrazone (IIb),
(10) 3-pentylpicolinaldehyde (o-chlorophenyl)hydrazone (IIb),
(11) 3-nitropicolinaldehyde (m-chlorophenyl)hydrozone (IIb),
(12) 4-nitropicolinaldehyde (p-chlorophenyl)hydrazone (IIb),
(13) 5-nitropicolinaldehyde (2,4-dichlorophenyl)hydrazone (IIb),
(14) 4-chloro-5-ethylpicolinaldehyde (2,5-dichlorophenyl)hydrazone (IIb),
(15) 4-chloro-6-methylpicolinaldehyde (3,5-dichlorophenyl)hydrazone (IIb),
(16) 5-ethyl-4-methylpicolinaldehyde (2,4,5-trichlorophenyl)hydrazone (IIb),
(17) 4-methyl-5-nitropicolinaldehyde (3,4,5-trichlorophenyl)hydrazone (IIb),
(18) 6-methyl-4-nitropicolinaldehyde (2,4,6-trichlorophenyl)hydrazone (IIb),
(19) 6-methyl-5-nitropicolinaldehyde (o-chlorophenyl)-hydrazone (IIb),
(20) 4,6-dimethyl-5-nitropicolinaldehyde (2,4-dichlorophenyl)hydrazone (IIb), etc.

PART B

Following the procedure of Part B of Example 4, but substituting other picolinaldehyde phenylhydrazones (IIb), (prepared as in Part A of Example 10), such as (1) picolinaldehyde phenylhydrazone (IIb),
(2) 4-chloropicolinaldehyde (m-chlorophenyl)hydrazone (IIb),
(3) 5-chloropicolinaldehyde (p-chlorophenyl)hydrazone (IIb),
(4) 5-methylpicolinaldehyde (3,5-dichlorophenyl)-hydrazone (IIb),
(5) 6-methylpicolinaldehyde (2,4-dichlorophenyl)-hydrazone (IIb),
(6) 3-ethylpicolinaldehyde (2,5-dichlorophenyl)-hydrazone (IIb),
(7) 5-ethylpicolinaldehyde (2,4,5-trichlorophenyl)-hydrazone (IIb),
(8) 3-propylpicolinaldehyde (o-chlorophenyl) hydrazone (IIb),
(9) 3-butylpicolinaldehyde (2,4-dichlorophenyl) hydrazone (IIb),
(10) 3-pentylpicolinaldehyde (2,4,6-trichlorophenyl) hydrazone (IIb),
(11) 3-nitropicolinaldehyde (3,5-dichlorophenyl) hydrazone (IIb),
(12) 4-nitropicolinaldehyde (m-chlorophenyl) hydrazone (IIb),
(13) 5-nitropicolinoyl chloride (2,4,5-trichlorophenyl) hydrazone (IIb),
(14) 4-chloro-5-ethylpicolinaldehyde (2,5-dichlorophenyl)hydrazone (IIb),

(15) 4-chloro-6-methylpicolinaldehyde (p-chlorophenyl) hydrazone (IIb),
(16) 5-ethyl-4-methylpicolinaldehyde (3,4,5-trichlorophenyl)hydrazone (IIb),
(17) 4-methyl-5-nitropicolinaldehyde (3,5-dichlorophenyl)hydrazone (IIb),
(18) 6-methyl-4-nitropicolinaldehyde (2,4-dichlorophenyl)hydrazone (IIb),
(19) 6-methyl-5-nitropicolinaldehyde (2,4,6-trichlorophenyl)hydrazone (IIb),
(20) 4,6-dimethylpicolinaldehyde (o-chlorophenyl) hydrazone (IIb), etc., yields, respectively, (1) picolinoyl chloride phenylhydrazone (I),
(2) 4-chloropicolinoyl chloride (m-chlorophenyl) hydrazone (I),
(3) 5-chloropicolinoyl chloride (p-chlorophenyl) hydrazone (I),
(4) 5-methylpicolinoyl chloride (3,5-dichlorophenyl) hydrazone (I),
(5) 6-methylpicolinoyl chloride (2,4-dichlorophenyl) hydrazone (I),
(6) 3-ethylpicolinoyl chloride (2,5-dichlorophenyl) hydrazone (I),
(7) 5-ethylpicolinoyl chloride (2,4,5-trichlorophenyl) hydrazone (I),
(8) 3-propylpicolinoyl chloride (o-chlorophenyl) hydrazone (I),
(9) 3-butylpicolinoyl chloride (2,4-dichlorophenyl) hydrazone (I),
(10) 3-pentylpicolinoyl chloride (2,4,6-trichlorophenyl) hydrazone (I),
(11) 3-nitropicolinoyl chloride (3,5-dichlorophenyl) hydrazone (I),
(12) 4-nitropicolinoyl chloride (m-chlorophenyl) hydrazone (I),
(13) 5-nitropicolinoyl chloride (2,4,5-trichlorophenyl) hydrazone (I),
(14) 4-chloro-5-ethylpicolinoyl chloride (2,5-dichlorophenyl)hydrazone (I),
(15) 4-chloro-6-methylpicolinoyl chloride (p-chlorophenyl)hydrazone (I),
(16) 5-ethyl-4-methylpicolinoyl chloride (3,4,5-trichlorophenyl)hydrazone (I),
(17) 4-methyl-5-nitropicolinoyl chloride (3,5-dichlorophenyl)hydrazone (I),
(18) 6-methyl-4-nitropicolinoyl chloride (2,4-dichlorophenyl)hydrazone (I),
(19) 6-methyl-5-nitropicolinoyl chloride (2,4,6-trichlorophenyl)hydrazone (I),
(20) 4,6-dimethylpicolinoyl chloride (o-chlorophenyl) hydrazone (I), etc.

*Example 11.—Other acid chloride phenylhydrazones (I)*

PART A

Following the procedure of Part A of Example 5, but substituting other known phenylhydrazines (III) and other known nicotinaldehydes (V), such as (1) phenylhydrazine (III) and 2-methylnicotinaldehyde (V),
(2) o-chlorophenylhydrazine (III) and 4-methylnicotinaldehyde (V),
(3) p-chlorophenylhydrazine (III) and 5-methylnicotinaldehyde (V),
(4) 2,4-dichlorophenylhydrazine (III) and 6-methylnicotinaldehyde (V),
(5) 3,5-dichlorophenylhydrazine (III) and 2-nitronicotinaldehyde (V),
(6) 2,4,5-trichlorophenylhydrazine (III) and 5-bromonicotinaldehyde (V), etc., yields, respectively, (1) 2-methylnicotinaldehyde phenylhydrazone (IIb),
(2) 4-methylnicotinaldehyde (o-chlorophenyl) hydrazone (IIb),
(3) 5-methylnicotinaldehyde (p-chlorophenyl) hydrazone (IIb),
(4) 6-methylnicotinaldehyde (2,4-dichlorophenyl) hydrazone (IIb),
(5) 2-nitronicotinaldehyde (3,5-dichlorophenyl) hydrazone (IIb),
(6) 5-bromonicotinaldehyde (2,4,5-trichlorophenyl)- hydrazone (IIb), etc.

PART B

Following the procedure of Part B of Example 5, but substituting other nicotinaldehyde phenylhydrazones (IIb) (prepared as in Part A of Example 11), such as (1) nicotinaldehyde phenylhydrazone (IIb),
(2) 2-methylnicotinaldehyde (m-chlorophenyl) hydrazone (IIb),
(3) 4-methylnicotinaldehyde (2,5-dichlorophenyl) hydrazone (IIb),
(4) 6-methylnicoatinaldehyde (3,5-dichlorophenyl) hydrazone (IIb),
(5) 2-nitronicotinaldehyde (3,4,5-trichlorophenyl) hydrazone (IIb),
(6) 5-bromonicotinaldehyde (2,4,6-trichlorophenyl) hydrazone (IIb), etc., yields, respectively, (1) nicotinoyl chloride phenylhydrazone (I),
(2) 2-methylnicotinoyl chloride (m-chlorophenyl) hydrazone (I),
(3) 4-methylnicotinoyl chloride (2,5-dichlorophenyl)- hydrazone (I),
(4) 6-methylnicotinoyl chloride (3,5-dichlorophenyl)- hydrazone (I),
(5) 2-nitronicotinoyl chloride (3,4,5-trichlorophenyl)- hydrazone (I),
(6) 5-bromonicotinoyl chloride (2,4,6-trichlorophenyl)- hydrazone (I), etc.

*Example 12.—Other acid chloride phenylhydrazones (I)*

PART A

Following the procedure of Part A of Example 6, but substituting other known phenylhydrazines (III) and other known nicotinic acid esters, such as (1) o-chlorophenylhydrazine (III) and 2-ethylnicotinic acid ethyl ester,
(2) o-chlorophenylhydrazine (III) and 6-methylnicotinic acid methyl ester,
(3) m-chlorophenylhydrazine (III) and 5-bromonicotinic acid ethyl ester,
(4) p-chlorophenylhydrazine (III) and 2-chloronicotinic acid ethyl ester,
(5) 2,4-dichlorophenylhydrazine (III) and 6-fluoronicotic acid methyl ester,
(6) 2,5-dichlorophenylhydrazine (III) and 5-nitronicotinic acid ethyl ester,
(7) 3,5-dichlorophenylhydrazine (III) and 2,6-dimethylnicotinic acid ethyl ester,
(8) 2,4,5-trichlorophenylhydrazine (III) and 5-ethyl-4-methylnicotinic acid methyl ester,
(9) 3,4,5-trichlorophenylhydrazine (III) and 2-chloro-6-methylnicotinic acid ethyl ester,
(10) 2,4,6-trichlorophenylhydrazine (III) and 2-chloro-4,6-dimethylnicotinic acid ethyl ester, etc., yields, respectively, (1) 2-ethylnicotinic acid 2-(o-chlorophenyl)hydrazide (IIa),
(2) 6-methylnicotinic acid 2-(o-chlorophenyl)hydrazide (IIa),
(3) 5-bromonicotinic acid 2-(m-chlorophenyl)hydrazide (IIa), (4) 2-chloronicotinic acid 2-(p-chlorophenyl)hydrazide (IIa),
(5) 6-fluoronicotinic acid 2-(2,4-dichlorophenyl)hydrazide (IIa),
(6) 5-nitronicotinic acid 2-(2,5-dichlorophenyl)hydrazide (IIa),
(7) 2,6-dimethylnicotinic acid 2-(3,5-dichlorophenyl)hydrazide (IIa),
(8) 5-ethyl-4-methylnicotinic acid 2-(2,4,5-trichlorophenyl)hydrazide (IIa),
(9) 2-chloro-6-methylnicotinic acid 2-(3,4,5 - trichlorophenyl)hydrazide (IIa),
(10) 2-chloro-4,6-dimethylnicotinic acid 2-(2,4,6-trichlorophenyl)hydrazide (IIa), etc.

PART B

Following the procedure of Part B of Example 6, but substituting other nicotinic acid 2-phenylhydrazides (IIa) (prepared as in Part A of Example 12), such as (1) 2-ethylnicotinic acid 2-(o-chlorophenyl)hydrazide (IIa),
(2) 6-methylnicotinic acid 2-(2,4-dichlorophenyl)hydrazide (IIa),
(3) 5-bromonicotinic acid 2-(3,5-dichlorophenyl)hydrazide (IIa),
(4) 2-chloronicotinic acid 2-(2,4,6 - trichlorophenyl)hydrazide (IIa),
(5) 6-fluoronicotinic acid 2-(m-chlorophenyl)hydrazide (IIa),
(6) 5-nitronicotinic acid 2-(2,5-dichlorophenyl)hydrazide (IIa),
(7) 2,6-dimethylnicotinic acid 2-(2,4-dichlorophenyl)hydrazide (IIa),
(8) 5-ethyl-4-methylnicotinic acid 2-(3,5-dichlorophenyl) hydrazide (IIa),
(9) 2-chloro-6-methylnicotinic acid 2-(2,4,5-trichlorophenyl)hydrazide (IIa),
(10) 2-chloro-4,6-dimethylnicotinic acid 2-(3,4,5-trichlorophenyl)hydrazide (IIa), etc., yields, respectively, (1) 2-ethylnicotinoyl chloride (o-chlorophenyl)hydrazone (I),
(2) 6-methylnicotinoyl chloride (2,4-dichlorophenyl)hydrazone (I),
(3) 5-bromonicotinoyl chloride (3,5-dichlorophenyl)hydrazone (I),
(4) 2-chloronicotinoyl chloride 2,4,6-trichlorophenyl) hydrazone (I),
(5) 6-fluoronicotinoyl chloride (m-chlorophenyl)hydrazone (I),
(6) 5-nitronicotinoyl chloride (2,5-dichlorophenyl) hydrazone (I),
(7) 2,6-dimethylnicotinoyl chloride (2,4-dichlorophenyl)hydrazone (I),
(8) 5-ethyl-4-methylnicotinoyl chloride (3,5-dichlorophenyl)hydrazone (I),
(9) 2-chloro-6-methylnicotinoyl chloride 2,4,5-trichlorophenyl)hydrazone (I),
(10) 2-chloro-4,6-dimethylnicotinoyl chloride (3,4,5-trichlorophenyl)hydrazone (I), etc.

The new insecticidal and miticidal Formula I heterocyclic acid chloride phenylhydrazones of this invention can be used as the pure compounds; but for practical reasons, the compounds are preferably formulated as pesticidal compositions. More particularly, the new heterocyclic acid chloride phenylhydrazones (I) are preferably formulated with a diluent carrier. Many different kinds of dispersible diluent carriers are commonly used in the art. Such carriers may or may not include adjuvants.

For example, pesticidal compositions useful against insects and mites which infest plants can be formulated as granulars, dusts, wettable powders, emulsifiable concentrates, aqueous dispersions, solutions, and flowable creams for application to insects, mites, objects, or a situs. Moreover, the new heterocyclic acid chloride phenylhydrazones (I) of the invention can be the sole active agent in a composition, or other insecticidal, miticidal, fungicidal, virucidal, bactericidal, or synergistic components may be included.

The heterocyclic acid chloride phenylhydrazones (I) of this invention can be readily formulated as dusts by grinding a mixture of the compounds and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to inanimate matter, fruit trees, crop plants, and soil so as to effect thorough distribution and coverage. Dusts are particularly adapted for effectively controlling insects and mites over wide areas when applied by airplane. They are also indicated for application to the undersides of plant foliage.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, sulfur, silica and silicates; chemically modified minerals such as washed bentonite, precipitated calcium silicate, synthetic magnesium silicate, and colloidal silica; and organic flours such as wood, walnut shell, soybean, cottonseed, and tobacco flours, and free-flowing hydrophobic starches.

Dusts can also be prepared by dissolving a Formula I heterocyclic acid chloride phenylhydrazone in a volatile solvent such as methylene chloride, mixing the solution with a pulverulent carrier and evaporating the solvent.

The proportions of pulverulent carrier and heterocyclic acid chloride phenylhydrazone (I) vary over a wide range depending upon the pests to be controlled and the conditions of treatment. In general, dust formulations can contain up to about 50% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, and soil. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, and X-171), e.g., about equal parts of sodium dodecylbenzene sulfonate and isooctylphenoxy polyethoxy ethanol containing about 12 ethoxy groups, and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to pests, plants or other pest habitats, or pest foods to control pests.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The compounds of this invention can be applied to insects, mites, objects, or a situs in aqueous sprays without a solid carrier. Such aqueous sprays are advantageous for certain types of spray equipment and conditions of application. They are also advantageous when uniform dispersions, homogeneous solutions, or other easily mixed aqueous sprays are desired.

Aqueous sprays without a solid carrier are prepared from concentrated solutions of the compounds of the invention in an inert organic solvent carrier. The inert organic solvent carrier may be one that is miscible or immiscible with water. The compounds that are somewhat soluble in water can be dissolved in a water miscible solvent carrier, e.g., ethanol and mixed with water to give homogeneous solutions. The compounds that are less soluble in water can be dissolved in a solvent carrier that is immiscible with water and the solution dispersed in water to give a uniform dispersion, e.g., an emulsion.

In an oil-in-water emulsion, the solvent phase is dispersed in the water phase and the dispersed phase contains the active ingredient. In this way, uniform distribution of a water insoluble active ingredient is achieved; in an aqueous spray. A solvent carrier in which heterocyclic acid chloride phenylhydrazones (I) are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects, mites, objects, or a situs.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils (a paraffinic, intermediate distillation fraction having a viscosity range from 40 to 85 seconds Saybolt and an unsulfonatable residue over 90 percent), ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The granular compositions of this invention are convenient for application to soil when persistence is desired. Granulars are readily applied broadcast or by localized, e.g., in-the-row applications. The individual granules may be any desired size from 30 to 60 mesh up to 20 to 40 mesh, or even larger. Granulars are prepared by dissolving the active compound in a solvent such as methylene chloride, xylene, or acetone and applying the solution to a quantity of a granulated absorbent carrier. Representative granulated absorbent carriers include ground corn cobs, ground walnut shells, ground peanut hulls, and the like. If desired, the impregnated granulated absorbent carrier can be coated with a coating that will preserve the integrity of the granular until it is applied to an object or situs favorable for release of the active ingredient.

The rates of application to insects, mites, objects, or situs will depend upon the species of pests to be controlled, the presence or absence of desirable living organisms, temperature conditions of treatment, and the method and efficiency of application. In general, pesticidal activity is obtained when the compounds are applied at concentrations of about 100 to about 6000 p.p.m. preferably at concentrations of about 500 to about 4000 p.p.m.

The compositions containing heterocyclic acid chloride phenylhydrazones (I) according to the invention, can be applied to insects, mites objects or situs by conventional methods. For example, an area of soil, a building, or plants can be treated by spraying wettable powder suspensions, emulsions, or solutions from power sprayers or from hand-operated knapsack sprayers. Dusts can be applied by power dusters, or by hand-operated dusters.

Creams and ointment formulations can be applied to objects for prolonged protection from insects and mites.

It will of course be appreciated that the conditions encountered when applying the method and compositions of this invention to actual practice can vary widely. Included among the variables that may be encountered are the degree of infestation by pests, the particular pest to be controlled, the particular situs being treated, the age or degree of development of plants to be protected, the prevailing weather conditions, such as temperature, relative humidity, rainfall, dews, and so forth.

The novel compounds described herein are versatile pesticidal agents which can be employed for many purposes, e.g., in agriculture, in industry, etc.

The novel heterocyclic acid chloride phenylhydrazones of Formula I are effective pesticides that can be used to control invertebrate pests in agriculture, in industry, and around the home. The compounds have been found to be active against invertebrate animals of the phylum Arthropoda, illustratively class Insecta, for example, order Coleoptera, more specifically, the cotton boll weevil (*Anthonomus grandis* Boheman), the confused flour beetle (*Tribolium confusum* Jacquelin de Val), and the Mexican bean beetle (*Epilachna varivestis* Muisant), order Orthoptera, more specifically, the house cricket (*Acheta domesticus* Linnaeus), and the German cockroach (*Blatella germanica* Linnaeus), and Class Arachnida, for example, order Acarina, more specifically, the two-spotted spider mite (*Tetranychus urticae* Koch).

Efficacy against invertebrate pests has been demonstrated at concentrations of 1000, 500, 100, 50 and even 10 p.p.m. of the novel heterocyclic acid chloride phenylhydrazones (I), depending upon the specific insect or mite used. Some invertebrate animal pests will be more sensitive to the compounds than others, and others might be quite resistant. In general, the compounds of Formula I are used at concentrations ranging from about 30 to about 6000 p.p.m.

I claim:

1. A compound of the formula 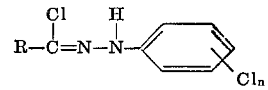 wherein R is pyridyl, which has from zero through three substituents selected from the group consisting of alkyl, halo and nitro, and *n* is an integer of from zero through three.

2. A compound of claim 1 wherein R is 2-pyridyl and *n* is three, namely, picolinoyl chloride (2,4,6-trichlorophenyl)hydrazone.

3. A compound of claim 1 wherein R is 3-pyridyl and *n* is three, namely, nicotinoyl chloride (2,4,6-trichlorophenyl)hydrazone.

4. A compound of claim 1 wherein R is 3-pyridyl and *n* is zero, namely, nicotinoyl chloride phenylhydrazone.

5. A compound of claim 1 wherein R is 2-chloro-4-pyridyl and *n* is three, namely, 2-chloropyridine-4-carbonyl chloride (2,4,6-trichlorophenyl)hydrazone.

6. A compound of claim 1 wherein R is 4-pyridal and *n* is three, namely, isonicotinoyl chloride (2,4,6-trichlorophenyl)hydrazone.

References Cited

FOREIGN PATENTS 436,833 11/1967 Switzerland ------- 260—566 B

OTHER REFERENCES

Chattaway: J. Chem. Soc. (1925), pp. 975–984.

HENRY R. JILES, Primary Examiner

R. T. BOND, Assistant Examiner

U.S. Cl. X.R.

260—329 AM, 347.7; 424—263, 275, 285